United States Patent Office 3,199,833
Patented Aug. 10, 1965

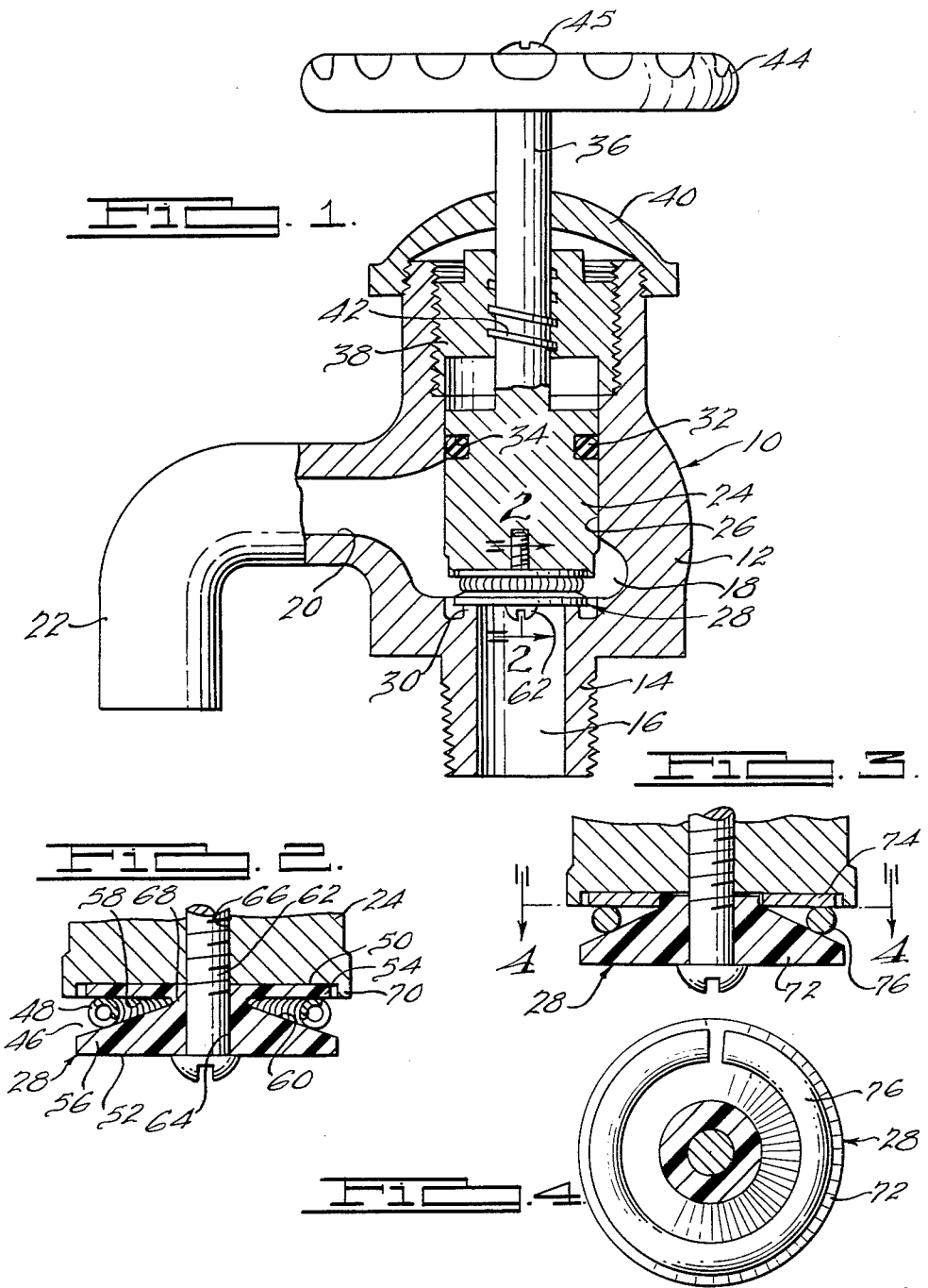

3,199,833
SEALING WASHER ENERGIZED BY AN
ANNULAR SPRING ELEMENT
Ralph L. Skinner, Sr., Birmingham, Mich., assignor to Skinner Products, Inc., Birmingham, Mich., a corporation of Michigan
Filed July 22, 1964, Ser. No. 384,475
7 Claims. (Cl. 251—176)

This invention relates to new and useful improvements in fluid valves and valve washers.

This application is a continuation-in-part of the copending application Serial No. 233,021, filed October 25, 1962.

An important object of the present invention is to provide a valve having a sealing washer that is longer lived than heretofore, that is relatively unaffected by heat normally occurring in use and that is resistant to corrosive and abrasive elements.

Another object of the invention is to provide a valve in which the washer is uniquely mounted on and associated with the valve stem so as to assure easy assembly of the washer on the stem and to position and retain the washer properly for engagement with the valve seat.

Still another object of the invention is to provide a valve of the above-mentioned character in which the washer is of a normally inert or inelastic polytetrafluoroethylene resin material and preferably of a material of this type commonly known and referred to in the trade as "Teflon" and wherein the washer is uniquely formed and energized to assure an effective sealing engagement thereof with the valve seat at all times when the valve is closed.

Yet another object of the invention is to provide a valve of the above-mentioned character in which the inert material of the washer is energized by a garter spring disposed in a peripheral groove provided in the washer and wherein the groove is uniquely formed so that an energizing spring can be used that is sufficiently strong to energize the sealing lip portion of the washer but which is not so strong that it tends to imbed in or otherwise permanently deform the washer material.

A further object of the invention is to provide a valve of the above-mentioned character in which the peripheral groove of the washer is uniquely formed to provide a relatively long radial travel for the spring when the valve is closed to assure concentration of the energizing force adjacent to the periphery of the sealing portion and substantially directly over the valve seat and wherein the valve stem is uniquely combined and correlated with the washer so that the confining and retaining portions of the stem do not obstruct or in any way interfere with the movement of the energizing spring.

Other objects and advantages of the invention will be apparent during the course of the following description.

In the drawing forming a part of this specification and wherein like numerals are employed to designate like parts throughout the same:

FIGURE 1 is a side view with parts broken away and shown in section of a valve embodying the invention, the valve being shown by way of illustration in the form of a bibb or faucet;

FIG. 2 is an enlarged, fragmentary sectional view taken on the line 2—2 of FIG. 1;

FIG. 3 is a diametrical sectional view showing a modified form of valve washer or seal embodying the invention; and FIG. 4 is a transverse sectional view taken on the line 4—4 of FIG. 3.

In the drawing wherein for the purpose of illustration is shown a preferred embodiment of the invention, the numeral 10 designates a bibb or faucet having a body 12 provided with a depending externally threaded connection 14 adapted for attachment to a water supply pipe or the like in the conventional manner. A fluid inlet 16 in the connection 14 communicates with a chamber 18 in the body 12, and water or other liquid admitted to the chamber 18 through the inlet 16 discharges therefrom through a passage 20 in the nozzle 22.

The flow of liquid through the body 10 is controlled by a generally cylindrical valve 24 which fits snugly and rotatably in a bore 26 extending upwardly from the chamber 18. The lower end of the valve 24 extends into the chamber 18 and carries a sealing washer 28 which is positioned to engage an upstanding annular valve seat 30 surrounding the inlet 16 at the juncture thereof with the chamber 18. From the foregoing, it will be readily apparent that, when the washer 28 bears on the valve seat 30 as shown in FIGURE 1, flow of fluid through the body 12 is shut off. An O-ring 32 mounted in an annular groove 34 provided in the valve 24 and located above the discharge passage 20 when the valve is fully lowered or closed frictionally engages the cylindrical wall of the bore 26 to prevent leakage of fluid in the valve body 12 upwardly between the valve and the bore.

An upwardly extending stem 36 on the valve 24 passes through a nut 38 threaded into the upper end of the body 12, as perhaps best shown in FIGURE 1, and through a cap 40 threaded on the upper end of the valve body 12. A threaded connection 42 between the valve stem 36 and the valve stem nut 38 causes the valve 24 to raise or lower in the body 12 depending upon the direction of rotation of the stem, and rotation of the latter is effected manually by the usual handle 44 on and fastened to the upper end of the stem by a screw 45. The thread 42 preferably has a relatively fast lead as shown so that the valve 24 can be moved between the upper and lower limits of its travel by a simple turn of the handle 44.

The washer 28 is of a normally inert or inelastic polytetrafluoroethylene resin material commonly known and referred to in the trade as "Teflon" as this material has a much longer life in the environment shown than rubber washers of the type now in common use. Not only is Teflon more resistant to wear and abrasion than rubber, but it is relatively unaffected by high temperatures of the order normally encountered in hot water faucets, for example. Teflon has substantially the same coefficient of thermal expansion as brass and other nonferrous metals commonly used in valves and particularly in faucets. Thus, the Teflon seal expands and contracts about the same amount and at about the same rate as the metal of the faucet so that the valve seal is relatively little affected by sudden and substantial temperature changes of the order normally encountered in a hot water faucet, for example. There is less tendency for the washer to separate from or reduce the pressure on the valve seat under extreme normal operating conditions. A further and perhaps unexpected benefit derived from the thermal expansion characteristic of Teflon, particularly in the case of a water faucet and other types of blending valves handling high temperature fluids, is that the Teflon washer helps to maintain the temperature of fluid traversing the valve constant at all times. These expansion characteristics are such that the flow and temperature of the fluid traversing the valve remain constant once the valve is set. This is in sharp contrast with valves using rubber washers, for example, in which the rubber material of the washer tends to swell and to change size at a different rate than the metal of the valve body so that the gap between the washer and the seat changes progressively over a period of time and as a result gradually changes the temperature of the fluid traversing the valve. The fact that Teflon does not swell as does rubber when exposed to high temperatures such as those occurring in a hot water faucet, for example, for a substantial period of time is further significant, as the washers tend to swell or expand against the seat. Consequently, deforming and destructive pressures are developed in the washer under these conditions which materially reduce its effective life. This condition is more or less completely mitigated in the case of Teflon, particularly when the washer is formed with a flexible sealing lip energized by a garter spring in the manner hereinafter described. Contrariwise, the pressure of a rubber washer against the seat sometimes is reduced under low temperature conditions sufficiently to permit leakage through the valve, particularly where the valve is closed initially under light pressure. This cannot occur in the case of the Teflon washer of this invention because of the energizing spring, as will be hereinafter apparent. Of significance also is the fact that leakage past the valve seat has a "wire drawing" effect on the sealing face of the washer. Minute grooves or channels are formed in the sealing face which quickly reduce the effectiveness of the washer and destroy its ability to maintain a tight seal against the seat under any conditions. This type of leak cannot occur when the energized Teflon washer of this invention is used. Also, the Teflon washer of this invention is relatively inert to petroleum products and to corrosive materials such as acids and the like. Thus, the washer 28 has general utility and is useful not only on water faucets but also in bibcocks and other valves commonaly found in commercial and industrial installations. A commercially available form of Teflon containing a powdered glass filler has been found to be particularly suitable for the purpose of this invention, as the glass filler makes the basic resin material harder and tougher and more wear-resistant. This material, and indeed all Teflon materials, has an exceedingly low coefficient of friction so that it turns more easily under pressure. Thus, it is easier to tighten the Teflon washer against the valve seal with sufficient pressure to assure complete stoppage of fluid through the valve and the possibility of the valve being closed with inadequate pressure resulting in immediate or eventual leakage past the seat and the attendant wire drawing and other deleterious effects are greatly reduced.

In the form shown in FIGS. 1 and 2, the washer 28 is formed entirely of Teflon, is generally disk-shaped and it has a peripheral groove 46 which accommodates a normally tensioned garter spring 48 of a type formed from a helically wound spring. The garter spring 48 is necessary in view of the inert inelastic nature and deformable characteristic of the Teflon materials. It enlivens the Teflon material and imparts a resiliency to the sealing flange potrion of the washer 28 which makes it function efficiently as a seal and assures a pressed engagement between the washer 28 and the seat 30 at all times when the valve is closed.

A valve having a Teflon washer 28 energized by a garter spring 48 in the manner herein shown and described will close off tightly relatively soon even though the washer 28 is not intially tightened properly against the seat 30 but bears only lightly on the seat 30 so that some leakage occurs initially past the washer. In this connection it will be observed that the groove 46 extends inwardly from the periphery of the washer 28 and, as indicated above, the garter spring 48 is under tension at all times. Thus, if the valve is loosely closed so that some leakage occurs initially past the seat 30, the constant constrictive force exerted by the garter spring 48 against the non-resilient and yieldable material of the washer 28 causes the sealing flange portion of the washer ahead of the groove 46 to yield or flex downwardly against the seat 30 relatively quickly to effect a tight seal. In order to accomplish this result it is necessary for the spring 48 to contrict slightly and to penetrate slightly deeper into the groove 46, but if the spring is properly initially tensioned, it will retain its tension under all operating conditions of the valve and will assure an effective seal under all normal closed conditions of the valve.

Conversely, the garter spring 48 is simply forced outwardly in the groove 46 in the event the washer 28 is tightened initially solidly against the seat 30. This event simply expands the garter spring 48 slightly so that it continues to exert a constrictive force on the tapered wall of the groove 46 and assures a tight sealing engagement between the washer 28 and the seat 30. However, the Teflon material itself is sufficiently tough and resistant to quick deflection or deformation that it will not yield sufficiently to force the garter spring 48 entirely out of the groove 46 even though the washer is tightened hard against the valve seat 30. Also, the Teflon material, and especially the glass-impregnated material of the type particularly recommended, in sufficiently hard and tough so that it effectively resists wear and permanent deformation under all of the above conditions and even though the washer 28 is tightened against the seat 30 with maximum pressure exertable by manual operation of the handle 44.

As perhaps best shown in FIGURE 2, the groove 46 is located substantially closer to the rear 50 of the washer 28 than to the front 52 to define a relatively thin annular rear seating flange 54 and a relatively thick, annular front sealing flange 56. Also, the rear wall 58 of the groove 56 is a flat, annular radial surface parallel to the rear face 50, and the front wall 60 of the groove is tapered inwardly and rearwardly to confine and seat the garter spring 48. It is desirable that the spring 48 not normally protrude radially outwardly from the groove 46 and by making one side of the groove flat and other side tapered, a relatively long travel is provided for the spring which lets it work back and forth in the groove without protruding under conditions of normal use. The spring 48 need not be particularly strong and, in fact, it can be quite weak as even a constant weak force against the inert and deformable material of the washer 28 will flex the sealing flange 56 eventually and actually relatively quickly and tightly against the seat 30 in the event the valve is not properly initially tightened or seated. The relatively long taper provided by the side 60 at the rear of the sealing flange 56 affords increased power for a given size or strength of spring and in turn enables a relatively soft spring to exert a desired amount of power or force against the sealing flange. A relatively soft spring is desirable in order to prevent it from embedding in the Teflon material and, to further prevent this from occurring, the outer surfaces of the spring convolutions preferably are ground flat as disclosed in my copending application, Serial No. 262,729, filed March 4, 1963.

In the form of the invention shown in FIGS. 1 and 2, the washer 28 is fastened to the valve 24 by a screw 62 which extends through a central opening 64 in the washer and into a threaded hole 66 in the valve. The screw 62 preferably fits the hole 64 relatively snugly so that it holds the washer centered on the valve 24 and with respect to the annular seat 30. Also, the annular peripheral groove 46 preferably is relatively deep and terminates relatively close to the hole 64 so as to define a relatively thin and flexible annular portion 68 between the bottom of the groove and the hole 64. This annular portion 68 provides a relatively weak easily flexed hinge section which yields readily under the constrictive force exerted by the garter spring 48 to assure an effective fluid-tight seal between the washer 28 and the screw 62, and also to assure a flat pressed engagement between the rear seating flange 54 and the supporting end of the valve 24. This of course is necessary in order to prevent liquid under pressure in the inlet 16 from penetrating past the screw 62 and behind the washer. Also, the relative thinness of the seating flange 54 enables the constant pressure exerted thereagainst by the spring 48 to maintain an effective seal between the washer 28 and the valve 24.

The valve 24 preferably has a forwardly extending annular flange 70 which normally surrounds the rear seating flange 54 of the washer 28. This flange 70 can be used to center or otherwise position the washer 28 on the valve 24; however, even though this centering function is performed solely by the fastening screw 62, the flange 70 still is useful to position the washer 28 approximately on the valve during installation. The surrounding flange 70, however, should not extend forwardly transversely across the groove 46, as this would cause interference between the flange and the garter spring 48 and perhaps even interfere with the operation of the spring in the event the latter is forced relatively far out in the groove 46 by excessive tightening of the washer 28 against the valve seat 30.

If desired, the rear seating flange 54 of the washer 28 can be of a size to fit snugly within the surrounding flange 70 of the valve 24, and this may be desirable in certain situations. However, it is possible because of the form and construction of the washer 28 to make the rear seating flange 54 relatively undersize so that radial clearance is provided between the flanges 54 and 70. This makes it possible for one size of washer to fit a number of different standard size valves 24. Also it is entirely feasible for the front sealing flange 56 to be larger in diameter than the rear seating flange 54, and this relative difference in the size of the washer flanges will not interfere with use of the washer on different size valve. In this event, however, the flange 70 preferably terminates flush with the inner side 58 of the seating flange 54 so that the end of the flange 70, in effect, forms a continuation of the flange 54 when this relationship obtains the aligned surfaces of the flanges 58 and 70 mutually co-operative to support the spring 48 as it moves radially in the groove 46 in use even though their surfaces are separated by a gap, and the mutual assistance and cooperation thus afforded by the flanges prevents the spring 48 from dropping over the outer edge of the undersize seating flange 54 under any conditions of use and perhaps being caught by the edge of the flange and rendered inoperative.

In the form of the invention shown in FIGS. 3 and 4, the washer 28 has a Teflon forward seating portion 72 which is identical in every material respect to the corresponding portion of the washer first described and a separate rear flange 74 preferably of metal or the like but otherwise identical to the corresponding portion of the first washer. Also, in the form of the invention now under consideration, the helically wound garter spring is replaced by a mechanically equivalent garter spring in the form of a solid or tubular, flexible and resilient split wire ring 76.

Except for the above, the modified valve is identical to the one first described and it will be readily apparent that, for all practical purposes, both forms of the invention function in the same way to achieve the same beneficial results.

Having thus described the invention, I claim:

1. In a valve of the type having
   a body provided with
      a fluid passage having an opening and a valve seat around said opening, and
   a valve stem mounted in said body for movement along the axis of said opening and relative to said valve seat, the improvement comprising
   a sealing washer of normally inert polytetrafluoroethylene resin material mounted on the inner end of said valve stem and movable therewith against and from said valve seat to control fluid flow through said passage, said washer being provided with a peripheral groove having
      a flat radial rear wall and,
      a forwardly and outwardly tapered front wall defining a rear seating portion and a front sealing portion and,
   a garter spring in said groove wedge between and simultaneously engaging said front and rear walls and exerting a constant continuous line pressure thereagainst, said spring adapted to expand and to ride radially outwardly on said front wall when said valve stem is actuated to tighten said washer against said valve seat, whereby to energize the front sealing portion of said washer and to maintain an effective seal against said valve seat,
   said valve stem having
      a radial end wall behind and flatly engaging and supporting said washer and,
      a forwardly extending annular flange surrounding and confining the rear seating portion of said washer,
   said groove and said garter spring extending forwardly of the surrounding flange, whereby said spring is free to expand in use without interference from said flange.

2. In a valve of the type having
   a body provided with
      a fluid passage having an opening and a valve seat around said opening, and
   a valve stem mounted in said body for movement along the axis of said opening and relative to said valve seat, the improvement comprising
   a sealing washer of normally inert polytetrafluoroethylene resin material mounted on the inner end of said valve stem and having a peripheral groove provided with
      a flat radial rear wall and
      a forwardly outwardly tapered front wall,
   a garter spring in said groove simultaneously engaging the front and rear walls thereof and exerting a constant continuous line pressure thereagainst,
   said valve stem being actuatable to move said washer under pressure against said valve seat to close said opening and the peripheral portion of said washer ahead of said groove adapted to be flexed rearwardly to energize said spring by pressure of said washer on said valve seat,
   said spring adapted to expand and ride radially outwardly on the tapered front wall of said groove when said valve is closed, whereby to energize the flexible forward portion of said washer and to maintain an effective seal against said valve seat,
   the radial rear wall of said groove assuring a relatively long travel of said spring radially outwardly in said groove and on the tapered forward wall of the latter, whereby to concentrate forward pressure exerted by said spring against the outer peripheral portion of said front wall and over said valve seat and to assure effective energization of said washer when said valve is closed.

3. In a valve of the type having
   a body provided with
      a fluid passage having an opening and a valve seat around said opening, and
   a valve stem mounted in said body for movement along the axis of said opening and relative to said seat, the improvement comprising
   a sealing washer of normally inert polytetrafluoroethylene resin material mounted on the inner end of said stem and movable therewith against and from said seat to control fluid flow through said passage, said washer provided with a peripheral groove having
      a flat radial rear wall disposed relatively close to the rear side of said washer and defining a relatively thin rear seating portion, and
      a forwardly and outwardly tapered front wall defining a relatively thick front sealing portion, and
   a garter spring in said groove wedged between and simultaneously engaging said rear seating portion and said front sealing portion, said spring adapted to expand and to ride radially outwardly on said portions when said valve stem is actuated to tighten said washer against said valve seat and operable under said conditions to energize said thin seating portion to hold the same under pressure against said valve stem and simultaneously to energize said front sealing portion to hold the same under pressure against said valve seat.

4. In a valve of the type having
a body provided with
a fluid passage having an opening and a valve seat around said opening, and
a valve stem mounted in said body for movement along the axis of said opening and relative to said seat, the improvement comprising
a sealing washer adapted to be mounted on the inner end of said stem and movable therewith against and from said seat to control fluid flow through said passage, said washer having a front seating portion of normally inert polytetrafluoroethylene resin material, and
a flat radial rear wall portion defining a relatively thin rear seating portion,
the front seating portion of said washer having a forwardly and outwardly tapered rear face which cooperates with the front face of said rear wall portion to define a peripheral groove,
a garter spring wedged in said peripheral groove and simultaneously engaging the tapered face of said front seating portion and the front face of said rear seating portion, said spring adapted to expand and to ride radially outwardly on the mentioned faces of said groove when said valve stem is actuated to tighten said washer against said valve seat and operable under said conditions to energize said rear seating portion to hold the same under pressure against said valve stem and simultaneously to energize said front seating portion to hold the same under pressure against said valve seat.

5. A sealing washer for use in a valve of the type having
a body provided with
a fluid passage having an opening and a valve seat around said opening, and
a valve stem mounted in said body for movement along the axis of said opening and relative to said seat,
said washer being of normally inert polyeterafluoroethylene resin material and adapted to be mounted on the inner end of said valve stem to move therewith against and from said valve to control fluid flow through said passage,
said sealing washer having a forwardly and outwardly tapered rear face,
means providing a radial bearing surface behind and spaced from the rear face of said washer, and
an annular spring element simultaneously engaging said tapered rear face and said bearing surface,
said spring adapted to be flexed when said valve stem is actuated to tighten said washer against said valve seat and operable under said conditions to energize said washer whereby to hold the same under pressure against said valve seat.

6. A valve of the type having
a body provided with a fluid passage having
an opening and
a valve seat around said opening, and
a valve stem mounted in said body for movement along the axis of said opening and relative to said valve seat, the improvement comprising
a sealing washer of normally inert polytetrafluoroethylene resin material mounted on the inner end of said stem and movable therewith against and from said valve seat to control fluid flow through said passage, said washer being provided with a peripheral groove having
a flat radial rear wall, and
a forwardly and outwardly tapered front wall defining a rear seating portion and a front sealing portion, and
a garter spring in said groove wedged between and simultaneously engaging said front and rear walls and exerting a constant continuous line pressure against said front wall, said spring adapted to expand and to ride radially outwardly on said front wall when said valve stem is actuated to tighten said washer against said valve seat whereby to energize the front sealing portion of said washer and to maintain an effective seal against said valve seat, said valve stem having
a radial end wall behind and flatly engaging and supporting said washer, and
a forwardly extending annular flange surrounding and confining the rear seating portion only of said washer,
the rear seating portion of said washer being smaller in diameter than said front sealing portion and fitting relatively loosely within the surrounding annular flange of said valve stem.

7. A valve of the type having
a body provided with a fluid passage having
an opening and
a valve seat around said opening, and
a valve stem mounted in said body for movement along the axis of said opening and relative to said valve seat, the improvement comprising
a sealing washer of normally inert polytetrafluoroethylene resin material mounted on the inner end of said stem and movable therewith against and from said valve seat to control fluid flow through said passage, said washer being provided with a peripheral groove having
a flat radial rear wall, and
a forwardly and outwardly tapered front wall defining a rear seating portion and a front sealing portion, and
a garter spring in said groove wedged between and simultaneously engaging said front and rear walls and exerting a constant continuous line pressure against said front wall, said spring adapted to expand and to ride radially outwardly on said front wall when said valve stem is actuated to tighten said washer against said valve seat whereby to energize the front sealing portion of said washer and to maintain an effective seal against said valve seat, said valve stem having
a radial end wall behind and flatly engaging and supporting said washer, and
a forwardly extending annular flange surrounding and confining the rear seating portion only of said washer,
the rear seating portion of said washer being smaller in diameter than said front sealing portion and fitting relatively loosely within the surrounding annular flange of said valve stem, the end of said surrounding flange being substantially flush or level with the inner side of said seating flange and cooperable with the latter in supporting said spring during radial travel thereof in said groove.

References Cited by the Examiner

UNITED STATES PATENTS

| | | | |
|---|---|---|---|
| 1,829,276 | 10/31 | Guthmuller | 137—383 |
| 1,917,000 | 7/33 | Tyden | 251—357 X |
| 2,569,471 | 10/51 | Harding | 251—357 |
| 2,635,846 | 4/53 | Smith | 251—357 X |
| 2,952,439 | 9/60 | Koons | 251—357 |
| 2,988,320 | 6/61 | Kent | 251—174 |
| 3,130,952 | 4/64 | Meyer | 251—176 X |

FOREIGN PATENTS 1,034,893  4/53  France.

ISADOR WEIL, *Primary Examiner.*

UNITED STATES PATENT OFFICE
CERTIFICATE OF CORRECTION

Patent No. 3,199,833                        August 10, 1965

Ralph L. Skinner, Sr.

It is hereby certified that error appears in the above numbered patent requiring correction and that the said Letters Patent should read as corrected below.

Column 3, line 26, for "commonaly" read -- commonly --; line 48, for "potrion" read -- portion --; line 69, for "contrict" read -- constrict --; column 4, line 12, for "in" read -- is --; column 6, line 25, for "forwardly outwardly" read -- forwardly and outwardly --; column 7, line 45, after "valve" insert -- seat --.

Signed and sealed this 15th day of February 1966.

(SEAL)
Attest:

ERNEST W. SWIDER                          EDWARD J. BRENNER
Attesting Officer                             Commissioner of Patents